June 9, 1964    E. D. MATTIX    3,136,325
CONTROLLED ADDITION OF GAS TO LIQUID
Filed May 24, 1962
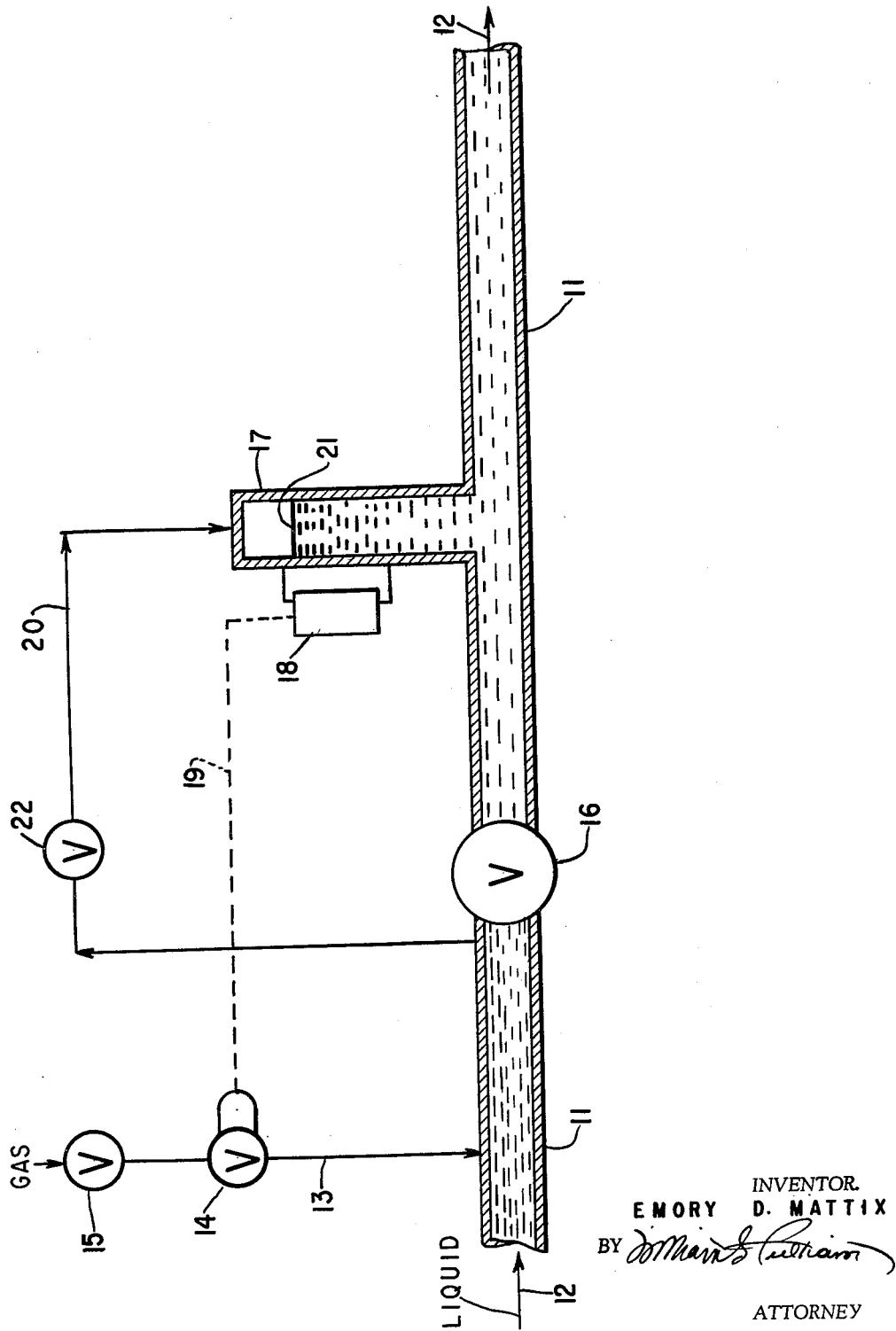
INVENTOR.
EMORY D. MATTIX
BY
ATTORNEY

United States Patent Office 3,136,325
Patented June 9, 1964

3,136,325
CONTROLLED ADDITION OF GAS TO LIQUID
Emory D. Mattix, Lake Charles, La., assignor to Cities Service Oil Company, Tulsa, Okla., a corporation of Delaware
Filed May 24, 1962, Ser. No. 197,422
5 Claims. (Cl. 137—3)

This invention relates to the addition of gas to absorbent liquid and more particularly to means for controlling such addition of gas to prevent excessive accumulation of unabsorbed gas in the liquid.

In the chemical industry there are many instances in which it is desired to add air of other gases to absorbent liquids but in which it is highly undesirable to have concentrations of the free gas accumulating in storage tanks, lines or other portions of processing equipment. Such undesirable accumulations of gas may easily lead to fire, explosion or injury to personnel. Despite this danger, previous methods of adding gases to liquids have depended entirely upon spot checks and calculations of the proper amount of gas to be added to avoid the addition of excessive amounts of gas which could not be absorbed in the liquid.

It is an object of the present invention to provide an improved process and apparatus for the addition of gas to an absorbent liquid whereby the addition of such gas may be controlled or stopped as necessary to prevent accumulation of dangerous amounts of unabsorbed gas in the liquid. In accordance with a preferred embodiment of the invention, this may be accomplished by accumulating any unabsorbed gas at a point downstream in the flow of liquid from the point at which gas is introduced to the liquid and controlling the rate of addition of gas to the liquid in response to any such accumulation of unabsorbed gas.

The process and apparatus of the present invention is applicable broadly to any situation in which it is desired to add a gas to an absorbent liquid in quantities up to the saturation point of such gas in such liquid but where it is desired to avoid any accumulation of unabsorbed gas in downstream processing equipment or in storage tanks, transfer lines, etc. Common processes in which gas is added to liquid include, for instance, the addition of air to petroleum products for inhibitor sweetening, the addition of air to copper chloride sweetening processes, the addition of said to the Bender sweetening process, the addition of chlorine to caustic when producing hypochlorite and the addition of air into absorbers, de-ethanizers and other processing equipment for corrosion control. In all of these instances and in many others the presence of the gas in the liquid in quantities up to the saturation point of the gas in the liquid is highly desirable but the presence of unabsorbed gas presents grave dangers of fire, explosion of injury to personnel.

While the invention will be described below primarily in conjunction with the addition of air to petroleum products for inhibitor sweetening, it should be understood that the invention is equally applicable to any other situations of the type described above in which a gas is added to a liquid but in which it is not desired to add so much gas to the liquid that unabsorbed free gas can accumulate in storage tanks or processing equipment.

For a better understanding of the invention, reference should be had to the accompanying drawing which is a diagrammatic illustration in which equipment is shown in elevation of a suitable arrangement of apparatus for carrying out a preferred embodiment of the invention.

Referring to the drawing, liquid to which it is desired to add a gas such as air is shown flowing through a conduit 11 as indicated by arrows 12. Gas such as air is added to this liquid as through a conduit 13 and control valve 14. While the gas is shown here as being added to the liquid while the liquid is flowing through a conduit, it should be understood that the gas may be added at any suitable point and by any suitable means during the processing of the liquid. A valve 16 shown in the conduit 11 may be used for conventional control of back pressure on the liquid flowing through the conduit 11.

In order to guard against the presence of excessive amounts of gas in the liquid flowing through the conduit 11, a chamber 17 is shown projecting upwardly from the conduit 11 a suitable distance downstream from the point of introduction of the gas through the conduit 13. The chamber 17 serves as a trap for any unabsorbed gas and should be located a sufficient distance from the point of introduction of the gas into the liquid to allow for complete absorption of gas by the liquid. This distance will, of course, vary depending upon the rate at which a particular gas used is absorbed into the particular liquid flowing through the conduit and upon the rate at which liquid is flowing through the conduit. The chamber 17 is shown here as a simple pipe of approximately the same diameter as the conduit 11 and extending vertically upward therefrom with its upper end closed. The chamber 17 may, however, take any suitable form provided it extends upwardly from and is in fluid communication with the conduit or the equipment through which the fluid is flowing so that the chamber 17 may serve as a trap for any unabsorbed gas present in the liquid at the time the liquid passes the point of fluid communication with the chamber.

Conventional liquid level control means, shown as a liquid level controller 18, are provided for acting in response to changes in the liquid level in the chamber 17 to operate the control valve 14 by suitable conventional means indicated as a control line 19. The liquid level controller 18 may be utilized to operate the control valve 14 to either reduce the rate of addition of gas or to completely shut off the flow of gas through the conduit 13. It is frequently desirable in normal use to control the amount of gas passing through the conduit 13 in the first instance to that amount which should be readily absorbable by the liquid. Suitable means such as a reduction orifice or valve 15 may be used for this purpose. The apparatus described herein may thus function as a safety valve to shut off flow of gas through the conduit 13 in the event that flow of liquid in the conduit 11 is disrupted or for some other reason the amount of gas passing into the conduit 11 through the conduit 13 becomes greater than that amount which can be absorbed by the liquid in the conduit 11. It should be understood, however, that it is well within the scope of the invention to utilize the liquid level controller 18 and control valve 14 in such a way as to continuously control the rate of addition of gas through the conduit 13 in response to the liquid level in the chamber 17.

In the ordinary operation of the apparatus shown in the drawing, gas is added through the conduit 13 to the liquid flowing through the conduit 11 in quantities such that all of the gas is absorbed by the liquid. The quantities of gas used and the pressure under which it is injected into the liquid may vary widely depending upon the particular gas and liquid involved. The chamber 17 is, therefore, normally filled with liquid, since the gas added is readily absorbable in the liquid. If for some reason the quantity of gas being added becomes excessive for the quantity of liquid passing through the conduit so that all of the gas added through the conduit 13 is not absorbed by the liquid in the conduit 11, then any gas which remains unabsorbed as the liquid passes the chamber 17 will pass upwardly into the chamber 17 and become trapped in the upper portion thereof, thereby establishing a liquid level in the chamber 17 as indicated at 21. As free gas thus accumulates in the chamber 17, the liquid level 21 therein is forced downwardly until the liquid level controller 18 reacts in response to such lowering of the liquid level to operate the control valve 14 so as to reduce or stop further addition of gas through the conduit 13. The control valve 14 will thus act in response to a lowering of the liquid level in the chamber 17 to reduce or completely shut off flow of gas until such time as the flow of liquid through the conduit 11 absorbs some of the gas from the chamber 17. Such absorption of free gas from the chamber 17 allows the liquid level in the chamber 17 to rise until the control valve 14 operating in response to the liquid level controller 18 opens to resume or to increase flow of gas through the conduit. Absorption gas from the chamber 17 may be expedited by passing a side stream of the liquid flowing through the conduit 11 directly through the chamber 17 as by the use of a conduit 20 and valve or reduction orifice 22. Absorption of gas from the chamber 17 is hastened if liquid from the conduit 20 is sprayed into the upper portion of the chamber 17.

*Example*

Apparatus of the type shown in the drawing and described above has been installed to control addition of air to gasolene being transported between an inhibitor addition treating step and storage facilities. In the type of conventional inhibitor sweetening to which the gasolene has been subjected, the inhibitor protects the gasolene against gum formation and some oxygen is needed in the gasolene to complete the action of the inhibitor. For this reason air is injected into the gasolene stream flowing through the conduit 11. Because of the explosive nature of mixtures of free air and gasolene fumes, it is, of course, extremely important that free air should not be allowed to build up in the conduit 11 or in subsequent storage tanks or treating facilities. Injection of air should be restricted to the amount capable of being completely absorbed in the gasolene under any given conditions of gasolene flow. In this particular instance, air is added through a conduit such as 13 to gasolene flowing through an 8 inch diameter conduit such as 11 at the rate of 25,000 barrels per day. This gasolene is flowing from inhibitor treatment to storage. Air is normally injected into the gasolene at about 30 lbs. pressure and at the rate of 1 cubic foot per barrel of gasolene. For this particular use, air is normally required at the rate of about ½ to 2 cubic feet per barrel of gasolene and is conveniently injected at pressures between atmospheric and about 50 p.s.i.g. The chamber 17 is in the form of an 8 inch pipe extending upwardly from and in fluid communication with the conduit 11. A conventional liquid level controller such as 18 is used to control the action of a control valve 14. In this instance, the control valve 14 functions only as a safety shutoff valve and is designed to completely shut off the flow of air through the conduit 13 in the event that all of the air added to the conduit 11 through the conduit 13 cannot be absorbed by the gasolene flowing therethrough.

With this arrangement of apparatus, the control valve 14 acts to shut off the flow of air into the conduit 11 in the event that free air accumulates in the chamber 17 in sufficient quantity to force the liquid level therein down any substantial distance from the top of the chamber. This occurs for instance, if the flow of gasolene through the conduit is substantially reduced or shut off without a corresponding reduction in the amount of air injected through the conduit 13. Upon resumption of normal flow of gasolene through the conduit 11, air in the upper portion of the chamber 17 is absorbed into the gasolene until the rising liquid level in the chamber 17 causes the control valve 14 to open to allow resumption of air injection through the conduit 13.

While the invention has been described above with respect to a preferred embodiment thereof, it will be understood by those skilled in the art that various changes and modifications may be made without departing from the spirit and scope of the invention and it is intended to cover all such changes and modifications in the appended claims.

I claim:

1. In a process in which a gas is mixed with and absorbed by an absorbent liquid, the method of preventing the introduction into the liquid of more gas than can be absorbed by said liquid which comprises accumulating any unabsorbed gas from the liquid subsequent to the introduction of gas into the liquid, controlling addition of gas to said liquid in response to such accumulation of unabsorbed gas, and passing a portion of said liquid through said accumulation of unabsorbed gas to aid in the absorption thereof.

2. In a process in which a gas is mixed with and absorbed by an absorbent liquid flowing through a conduit, the method of preventing the introduction into the liquid of gas at a greater rate than the rate at which gas can be absorbed by said liquid which comprises accumulating any unabsorbed gas from said liquid at a point downstream from the point of introduction of gas into liquid, controlling the rate of addition of said gas to said liquid in response to such accumulation of unabsorbed gas, and passing a portion of said liquid through said accumulation of unabsorbed gas to aid in the absorption thereof.

3. In a process in which a flow of gas is continuously mixed with and absorbed by an absorbent liquid flowing through a conduit, the method of preventing the introduction into the liquid of gas at a greater rate than the rate at which gas can be absorbed by said liquid which comprises accumulating any unabsorbed gas from said liquid at a point downstream from the point of introduction of gas into liquid, shutting off the flow of said gas to said liquid in response to such accumulation of unabsorbed gas, taking a side stream of liquid from the conduit upstream from the accumulation of unabsorbed gas, passing said side stream through the unabsorbed gas to aid in the absorption thereof, and resuming such flow of gas in response to absorption of said accumulated unabsorbed gas into the liquid.

4. Apparatus for controlling the rate of addition of a gas to an absorbent liquid flowing through a conduit which comprises: means for introducing said gas into said conduit at a controlled rate, a chamber in fluid communication with and extending upwardly from said conduit downstream from the point of introduction of said gas into said conduit, means for passing a side stream of liquid from the conduit upstream from the chamber to the upper portion of the chamber and means responsive to the level of liquid in said chamber for controlling the rate of introduction of said gas into said conduit.

5. Apparatus for controlling addition of a gas to an absorbent liquid flowing through a conduit which comprises: means for introducing a flow of said gas into said conduit, a chamber in fluid communication with and extending upwardly from said conduit downstream from the point of introduction of said gas into said conduit, means for passing a side stream of liquid from the conduit upstream from the chamber to the upper portion of the chamber and means responsive to the level of liquid in said chamber for shutting off the flow of said gas into said conduit in response to an accumulation of unabsorbed gas in said chamber.

References Cited in the file of this patent
UNITED STATES PATENTS
2,642,747   Le Van _____ June 23, 1953